United States Patent [19]

Sakamaki

[11] Patent Number: 5,570,399
[45] Date of Patent: Oct. 29, 1996

[54] CONTROL ROD AND SUPPORTING METAL GRIPPING APPARATUS AND METHOD OF WITHDRAWING SAME

[75] Inventor: Kazuo Sakamaki, Yokohama, Japan

[73] Assignee: Kabushiki Kaisha Toshiba, Kawasaki, Japan

[21] Appl. No.: 607,198

[22] Filed: Feb. 26, 1996

Related U.S. Application Data

[63] Continuation of Ser. No. 292,769, Aug. 19, 1994, abandoned.

[30] Foreign Application Priority Data

Aug. 19, 1993 [JP] Japan .................................. 5-205304

[51] Int. Cl.⁶ .................................................. G21C 19/10
[52] U.S. Cl. .......................................... 376/260; 376/262
[58] Field of Search ..................................... 376/260, 262

[56] References Cited

U.S. PATENT DOCUMENTS

| | | | |
|---|---|---|---|
| 4,904,443 | 2/1990 | Carruth | 376/260 |
| 5,329,563 | 7/1994 | Baversten | 376/260 |
| 5,331,675 | 7/1994 | Hosoya et al. | 376/260 |
| 5,377,239 | 12/1994 | Nopwaskey et al. | 376/260 |

FOREIGN PATENT DOCUMENTS

| | | |
|---|---|---|
| 60-39834 | 11/1985 | Japan . |
| 63-295996 | 12/1988 | Japan . |

*Primary Examiner*—Daniel D. Wasil
*Attorney, Agent, or Firm*—Oblon, Spivak, McClelland, Maier & Neustadt, P.C.

[57] ABSTRACT

A control rod and fuel supporting member gripping apparatus for gripping a fuel supporting member and a control rod is disposed in a reactor pressure vessel. The fuel supporting member is mounted on a core supporting plate and has fuel assembly supporting holes in which the bottom portions of fuel assemblies are inserted. The control rod is detachably connected with a control rod driving mechanism through a bayonet coupling and is passed through a control rod passage so as to be lifted up and down in order to remove the fuel supporting member and the control rod from the core supporting plate and the control rod driving mechanism. The control rod and fuel supporting member gripping apparatus comprises a gripping apparatus body hoisted vertically liftably in an installed state within the reactor pressure vessel, a fuel supporting member gripping device disposed at a portion below the gripping apparatus body, a control rod gripping device device disposed at a portion below the gripping apparatus body to be liftable up and down and rotatable with respect to the gripping apparatus body, and a rotating mechanism for rotating the control rod gripping device.

In withdrawing the control rod and fuel supporting member from the reactor pressure vessel, the fuel supporting member is raised to a height above the control rod and is prevented from rotating, the control rod is thereafter rotated, and the fuel supporting member and the control rod are withdrawn from the reactor pressure vessel substantially at the same time.

14 Claims, 16 Drawing Sheets

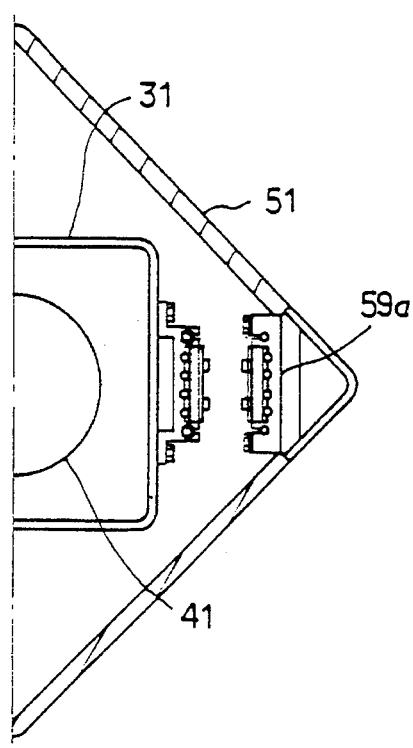
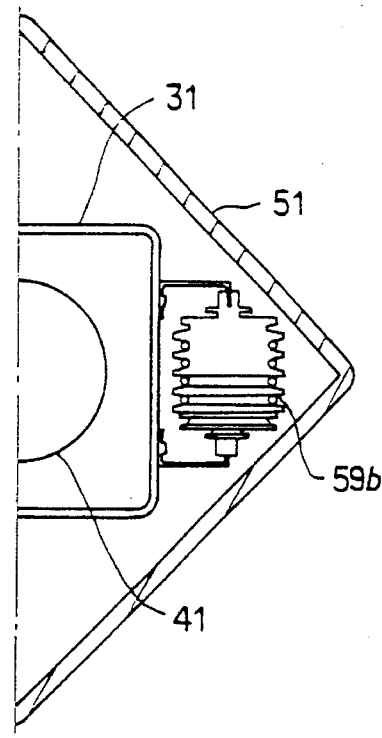
FIG. 7A  FIG. 7B
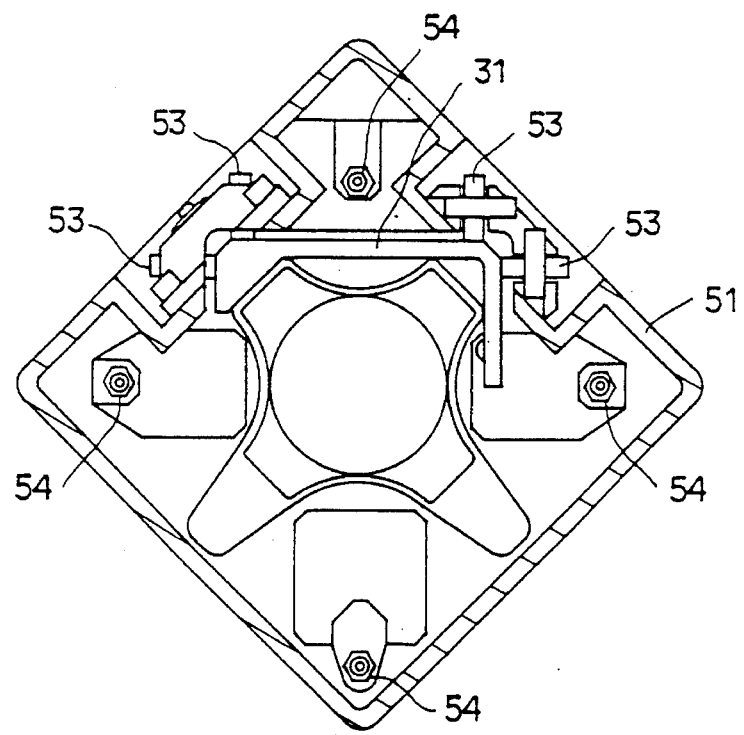
FIG. 8

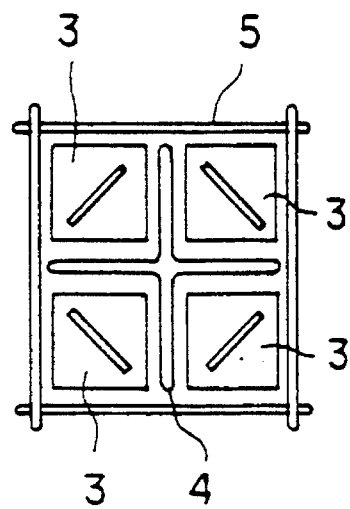
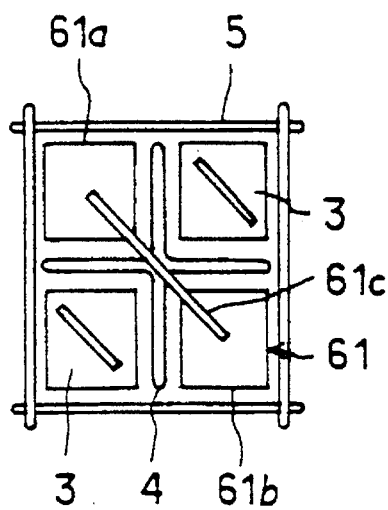
FIG. 9A  FIG. 9B
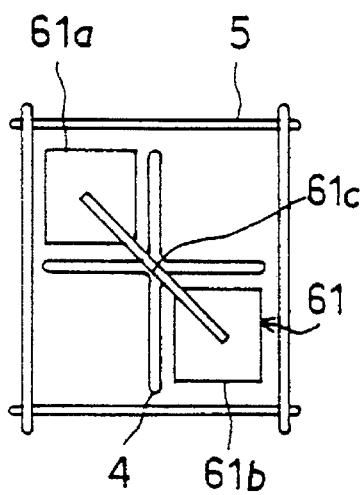
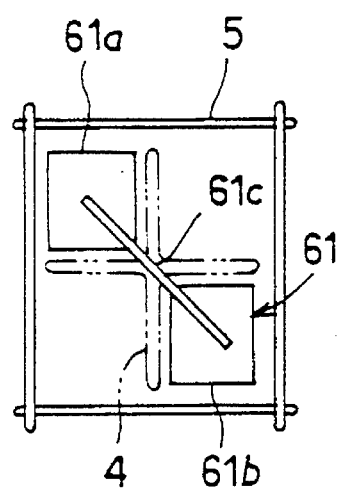
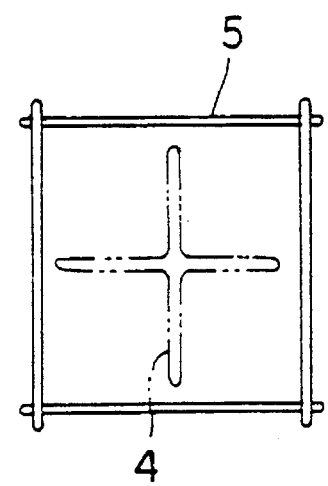
FIG. 9C  FIG. 9D  FIG. 9E

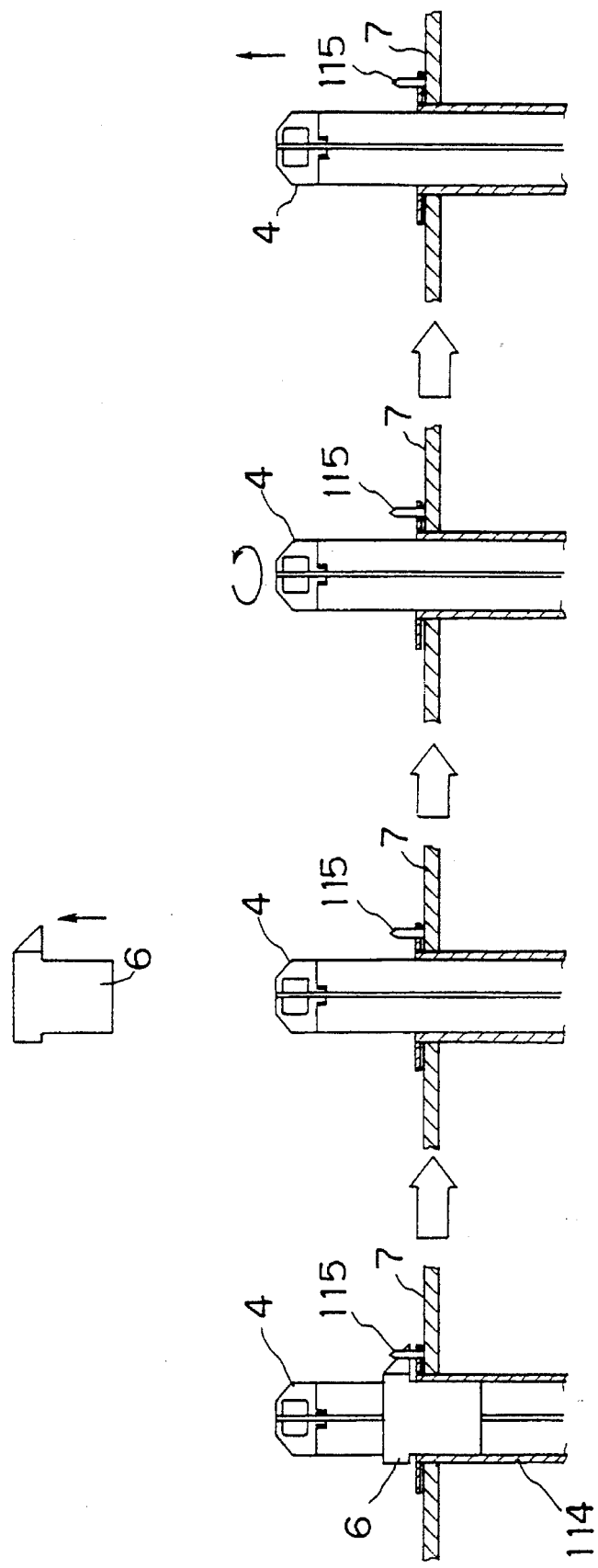

CONTROL ROD AND SUPPORTING METAL GRIPPING APPARATUS AND METHOD OF WITHDRAWING SAME

This application is a continuation of application Ser. No. 08/292,769, filed on Aug. 19, 1994, now abandoned.

BACKGROUND OF THE INVENTION

The present invention relates to a control rod and fuel supporting member gripping apparatus for gripping a control rod (hereinafter referred to as CR) and a fuel supporting member ( hereinafter referred to as FS) in order to remove and carry the CR and FS out of the reactor and to load the CR and FS again in the reactor, and also relates to a method of withdrawing the control rod and fuel supporting member gripping apparatus.

Generally, the core of the boiling water reactor (BWR) is constructed as shown in FIG. 13 and a plurality of fuel assemblies 3 and CRs (control rods) 4 are mounted in a cylindrical core shroud 2 contained in a reactor pressure vessel 1.

The top portions of these fuel assemblies 3 are supported by means of an upper lattice plate 5 and the bottom portions thereof are supported by means of a core supporting plate 7 through FSs (fuel supporting member) 6.

The respective FSs 6 are supported by means of the core supporting plate 7 by engaging the cylindrical bottom portion thereof with an FS supporting engagement hole 7a as shown in FIG. 15. As shown in FIG. 16, the square top portion of the core supporting plate 7 has supporting engagement holes 6a, 6b, 6c, 6d for allowing the bottom of the fuel assembly 3 to engage therewith for supporting the fuel assembly 3 and has a cross shaped insertion hole for allowing the CR 4 to go through.

The respective supporting engagement holes 6a–6d communicate with respective orifices 6e, 6f, 6g, 6h which are located on the sides of the supporting engagement holes in order to allow coolant to flow into the respective fuel assemblies 3 from the respective orifices 6e–6h through the respective supporting through holes 6a–6d. A through hole 6i which engages with a fixing pin 7b implanted on the core supporting plate 7 is provided on a square corner of the top portion of the FS 6 in order to fix the FS 6 onto the core supporting plate 7.

On the other hand, the CR 4 is detachably connected to a control rod driving mechanism (hereinafter referred to as CRD) which is provided so as to vertically go through the bottom of the reactor pressure vessel 1 and the CR 4 is lifted up and down by means of each CRD 8 so as to be inserted into and pulled from the core.

The CR 4 passes through a CR guide pipe 9 which is connected to the core supporting plate 7 so that the CR 4 is lifted up and down through a cross shaped insertion hole 4a formed among the four bodies of the fuel assemblies 3, 3, 3, 3 which are supported by means of the FS 6.

A conventional coupling mechanism for the CR 4 and the CRD 8 is constructed in the form of a spud as shown in FIG. 17. As for the spud type coupling 10, a coupling spud 11 having locking pawls which are formed by incising the circumferential portion thereof so as to obtain, for example, four split parts is pushed up strongly by means of a driving piston, not shown, of the CRD 8 and then inserted into a gap around a lock plug 12 which is inserted into the engagement hole in the bottom portion 4b of the CR 4. Consequently, the coupling spud 11 is nipped between the internal face of the bottom portion 4b of the CR 4 and the external face of the lock plug 12 in order to connect the CR 4 with the CRD 8.

By pushing up the lock plug 12 by means of an uncoupling rod 13 of the CRD 8 to resist the force of a spring 4c, the CR 4 is disconnected from and released from the CRD 8.

When the CR 4 is removed from the CR driving mechanism in the reactor pressure vessel 1 and carried out of the core at the time of the periodic inspection of the BWR, first of all, the fuel assemblies 3 are pulled out of the core.

However, since in the conventional BWR, the connection between the CR 4 and the CRD 8 is released by pushing the lock plug 12 strongly by means of the uncoupling rod 13, if such a foreign matter as clad or the like is caught between the lock plug 12 and the coupling stud 11, the lock plug 12 sticks firmly to the coupling spud 11, so that it may be impossible to disconnect the CR 4 from the CRD 8.

To solve such a problem, recently a bayonet coupling 14 as shown in FIGS. 18A–18C has been sometimes employed as a connecting means for the CR 4 and the CRD 8.

The bayonet coupling 14 has engaging protrusions 16 having a specified width which are disposed at every 90° along the circumference thereof, the engaging protrusions protruding out of the internal face of an engaging hole 15 in the bottom portion 4b of the CR 4 in which the coupling spud 11 is to be inserted. By turning the bayonet coupling 14 or the CR 4 by 45° along the circumference thereof as shown in FIG. 18B, the respective engaging protrusions 16 are moved along the external face of the respective coupling spuds 11 to reduce the diameter of the respective coupling spuds 11. Consequently, the lock plug 17 is nipped to connect the CR 4 with the CRD 8.

If the CR 4 is turned further by 45° or returned to its original position as shown in FIG. 18C, the respective coupling spuds 11 are moved to respective cavities of the engaging hole 15 to expand the diameter of the coupling spuds 11, thereby releasing connection between the CR 4 and the CRD 8.

In the CR 4 which employs the aforementioned bayonet coupling 14, no foreign matter such as clad or the like is caught between the lock plug 12 and the coupling spud 11 unlike the conventional spud type coupling 10. Thus, it is possible to release the CR 4 from the CRD 8 securely.

It is necessary to turn the bayonet coupling 14 or the CR 4 axially by 45° to release the CR 4 from the CRD 8. However, because the CR 4 is inserted through the cross shaped insertion hole 4a of the FS 6 which is fixed by the fixing pin 7b of the core supporting plate 7, it is not possible to turn the CR 4. If the CR 4 is turned forcibly, the CR 4 and the FS 6 may be damaged.

If the CR 4 and the FS 6 are turned at the same time after the FS 6 is removed from the fixing pin 7b of the core supporting plate 7 so that the FS 6 is free, the top portion of the FS 6 collides with fuel assemblies in the lattice in the vicinity because the top portion thereof is square shaped, so that the fuel assemblies 3 may be damaged.

FIG. 19A shows a plan view of the CR 4 and the FS 6 viewed from the upper side of the upper lattice plate 5 in a steady state. As shown in FIG. 19A, the CR 4 is located in the same direction as that of the upper lattice plate 5, and the FS 6 has a shape capable of passing the cell 5' formed to the upper lattice plate 5. The FS 6 is provided with projections 6' which can nip a pin 7b provided to the core supporting plate 7 to thereby prevent the FS 6 from rotating. The fuel assemblies, each having a square cross section, are positioned on the fuel assembly supporting through holes 6a, 6b, 6c, 6d formed to the FS 6. A reactor core is constituted by about 100 units of fuel assemblies, each unit including the thus arranged four fuel assemblies.

When the CR 4 and the FS 6 now in the state of FIG. 19A are simultaneously gripped by the respective gripping devices and are then lifted to rotate them, the projections 6' of the FS 6 contact the surrounding fuel assemblies. This state is shown in FIG. 19B showing an arrangement in which the CR 4 and the FS 6 are rotated by 45° from the arrangement shown in FIG. 19A. In this arrangement, the projections 6' project out of the cell 5', which may contact the fuel assembly disposed in the upper side cell and hence damage the same. In order to obviate such defect, as shown in FIG. 19C, sixteen fuel assemblies of the other four cells 5" surrounding the cell 5' now treated as well as the four fuel assemblies of the cell now treated have to be withdrawn upward from the core and conveyed to the fuel storage pool formed upper outside of the reactor pressure vessel, thus being troublesome and inconvenient in the prior art technology.

SUMMARY OF THE INVENTION

An object of the present invention is to substantially eliminate defects or drawbacks encountered in the prior art described above and to provide a control rod and fuel supporting member gripping apparatus in which the CR and CRD, which are detachably connected by means of the bayonet coupling, can be released and disconnected from each other simply, securely and rapidly and in which the CR and the FS can be removed from the reactor pressure vessel and lifted up to be carried out thereof, and also provide a method of withdrawing the control rod and fuel supporting member gripping apparatus from a reactor core easily and effectively.

This and other objects can be achieved according to the present invention by providing a control rod and fuel supporting member gripping apparatus for gripping a fuel supporting member and a control rod, the fuel supporting member being mounted on a core supporting plate located below an upper lattice plate within a reactor pressure vessel and having fuel assembly supporting engagement holes in which the bottom portions of a plurality of fuel assemblies are inserted to support the fuel assemblies and an insertion hole through which a control rod is passed, the control rod being detachably connected with a control rod driving mechanism by means of a bayonet coupling and being passed through a control rod passage so as to be lifted up and down freely in order to remove the fuel supporting member and the control rod from the core supporting plate and the control rod driving mechanism, the control rod and fuel supporting member gripping apparatus comprising:

a gripping apparatus body hoisted elevationally liftably in an installed state within the reactor pressure vessel;

a fuel supporting member gripping device disposed at a portion below the gripping apparatus body;

a control rod gripping device disposed at a portion below the gripping apparatus body to be liftable up and down and rotatable with respect to the gripping apparatus body; and means for rotating the control rod gripping device with respect to the gripping apparatus body.

In preferred embodiments of the present invention, the fuel supporting member gripping device includes a detection means for detecting a fact of settlement of the gripping apparatus body on the fuel supporting member gripping device.

The gripping apparatus may further comprise a detection means for detecting a fact that a rotation angle of the control rod gripping device is rotated by an angle over a predetermined angle.

An upper lattice plate is disposed above the gripping apparatus body at an upper portion of the reactor pressure vessel and an upper plate is disposed on the upper lattice plate through a gripping apparatus body lifting device for lifting up and down the gripping apparatus body with respect to the upper lattice plate. The control rod gripping device comprises a hook means which is hung by a rotating member rotatably fixed to the upper plate in order to releasably grip a handle of the control rod, a first driving means for driving the control rod gripping device for making the hook perform gripping and releasing operations, a second driving means for lifting up and down the control rod lifting mechanism by raising the hook means, a third driving means having a reciprocal piston rod for driving a winding means, and a rotating device for rotating the rotating body clockwise or counterclockwise by connecting both ends of the winding means attached to a rotating member in rotational association with the rotating body to both ends of the reciprocal piston rod of the third driving means. Preferably, the first, second and third driving means are air cylinder assemblies.

The first driving means includes a biasing means for maintaining the gripping operation of the hook means when a supply of fluid is eliminated. The first driving means is connected to a rope means for releasing the hook means at a time when the rope means is pulled to thereby forcibly perform the releasing action.

The fuel supporting member gripping device comprises a first driving source which makes a pair of retractable gripping plungers protrude from the inside of the fuel supporting member into a pair of side holes communicating with the respective fuel assembly supporting engagement holes of the fuel supporting member and facing each other in a direction of a diameter thereof in order to grip the fuel supporting member, and a second driving source which grips the fuel supporting member by means of the gripping plungers and which hoist the fuel supporting member. The fuel supporting member gripping portion comprises a locking mechanism for holding the first drive source in the gripping position when the fuel supporting member is gripped by means of the first drive source and hoisted by means of a lifting mechanism in order to prevent the gripped fuel supporting member from being released. The first driving means includes a gripping state holding mechanism for maintaining the gripping state of the fuel supporting member when a driving supply is eliminated. The first driving means is connected to a rope and a pair of plungers are retracted from a pair of side holes to an inside of the fuel supporting member, when the rope is pulled, in order to forcibly release the fuel supporting member.

In another aspect of the present invention, there is provided a method of withdrawing control rod and fuel supporting member from a reactor pressure vessel, in which the fuel supporting member is mounted on a core supporting plate located below an upper lattice plate within a reactor pressure vessel and has fuel assembly supporting engagement holes in which the bottom portions of a plurality of fuel assemblies are inserted to support the fuel assemblies and an insertion hole through which a control rod is passed and the control rod is connected to a control rod driving mechanism by means of a bayonet coupling and is passed through a control rod passage so as to be lifted up and down freely in order to remove the fuel supporting member and the control rod from the core supporting plate and the control rod driving mechanism, the method comprising the steps of:

lifting upward the fuel supporting member from the core supporting plate by a predetermined distance;

rotating the control rod by a predetermined angle to separate the control rod from the control rod driving mechanism; and withdrawing the fuel supporting member and the control rod from an upper portion of the reactor pressure vessel.

According to the structures and characters of the present invention described above, generally, after the fuel assembly contained in a given lattice plate with a reactor pressure vessel is pulled out by means of a fuel exchanging device or the like, a body of the control rod and fuel supporting member gripping apparatus is hoisted in the lattice and lowered thereinto. After the lower portion of the apparatus body is settled on the upper surface of the FS, the fuel supporting member gripping device is operated to grip the FS, and in the similar manner, the control rod gripping device is operated to grip the control rod. Thereafter, only the FS is lifted upward to the predetermined level, at which the lower end of the FS is higher than the upper end of the CR, by driving the lift up and down mechanism disposed in the body of the gripping apparatus or by driving the hoist disposed to the upper portion of the apparatus body and lifting up the whole body by means of the hoisting wire, for example.

Thereafter, the control rod gripping device is rotated with respect to the body of the gripping apparatus by means of a driving mechanism. Since the control rod is fixed to the control rod driving mechanism, the control rod is simultaneously rotated, thus being uncoupled from the control rod driving mechanism. During this rotating operation, since the FS is positioned above the upper end of the CR, the FS and the CD do not contact.

Then, the entire body of the gripping apparatus is lifted upward by means of the wire rope and then moved to and stored in a pool disposed upper outside of the reactor pressure vessel.

Therefore, according to the present embodiments, it is possible to grip and then remove the CR and the FS which are located within the reactor pressure vessel and hoist the CR and the FS to be carried out of the reactor pressure vessel. Thus, as compared with the conventional apparatus in which the CR and the FS are gripped separately by means of different gripping devices successively and carried out of the reactor pressure vessel after they are removed from the gripping devices, the present invention is capable of improving the working efficiency of hoisting operation markedly. Consequently, it is possible to improve the working efficiency of the BWR's periodic inspection markedly.

Furthermore, the CR lifting air cylinder of the CR gripping portion makes it possible to adjust the hoisting height depending on the pressure of supplied air. Thus, by increasing the pressure of supplied air successively from low pressure to high pressure, it is possible to lift the hook to such an extent in which a play between the hook and the control rod gripped by the hook is eliminated and then hoist the hook higher. Thus, because the present invention is capable of relaxing a shock which occurs when the CR is hoisted by means of the hook all at once, it is possible to increase the completeness and safety of the CR when the CR is hoisted. Further, in the control rod rotating mechanism, the rotating members which rotate the rotating body which has the hook for gripping the handle of the CR are connected to the clockwise-counterclockwise rotating air cylinder through a wire in order to turn the rotating body. Thus, it is possible to reduce the load of the rotating force.

If the supply of air to the control rod gripping air cylinder is interrupted when the CR is gripped by means of the hook which is actuated by the control rod gripping air cylinder, the gripping action of the control rod gripping air cylinder is maintained by the force of the biasing means, preferably, spring. Thus, even if the supply of air to the control rod gripping air cylinder is interrupted due to a breakage of the air hose or the like when the CR is gripped and hoisted by means of the hook, the hook does not release the CR. Thus, the safety operation can be assured.

When the CR cannot be released due to a trouble in the control rod gripping air cylinder, it is possible to forcibly release the CR by pulling the rope.

Because a pair of plungers are protruded into a pair of the existing side holes of the FS to support the FS, it is not necessary to make devices for the FS for assuring the gripping operation. Further, because a pair of plungers are inserted into a pair of side holes which faces each other with respect to the diameter of the FS to support and hoist the FS, the FS can be supported and hoisted stably with a balance with respect to the diameter thereof. Thus, it is possible to increase the reliability and the safety of supporting and hoisting the FS.

When the FS is gripped by means of the FS gripping portion and hoisted, the gripping state is locked by the locking mechanism. Thus, it is possible to prevent the FS from dropping due to the action of releasing the fuel supporting member and damaging, thereby increasing the operational reliability and safety.

If the supply of air to the FS gripping air cylinder is interrupted due to a breakage of the air hose when the FS is held by means of the FS gripping air cylinder, the gripping action of the FS gripping air cylinder is maintained by the force of the biasing means.

Thus, if the supply of air to the FS gripping air cylinder is interrupted due to a breakage of the air hose when the FS is gripped and hoisted, the FS is held, thereby securing the safety operation.

When the action of releasing the FS cannot be performed due to a trouble in the FS gripping air cylinder, it is possible to forcibly release the FS by pulling a rope.

When the upper plate is settled on the upper lattice plate, the CR gripping portion is settled on the handle of the control rod, and the FS gripping portion is settled on the FS, the settlement of these portions are detected by means of respective settling detection devices. Thus, it is possible to confirm whether they are settled or not, as required, before the CR and the FS are gripped, removed and hoisted. As a result, the reliability of such a sequence of the operations can be increased and the operations can be performed smoothly.

The looseness of the air hose and the cable is always absorbed by means of the cable absorbing mechanism. Thus, it is possible to reduce the possibility of a trouble which may occur when the air hose or the cable is hooked on other member due to such looseness, thereby increasing the operational reliability.

The nature and further features of the present invention will be made more clear hereunder through the description made with reference to the accompanying drawings.

BRIEF DESCRIPTION OF THE DRAWINGS

In the accompanying drawings:

FIGS. 7A and 7B are sectional views taken along the lines VIIA—VIIA and VIIB—VIIB, respectively of FIG. 3;

FIG. 8 is a sectional view taken along the lines VIII—VIII of FIG. 3;

FIGS. 9A to 9E are plan views showing steps for pulling fuel assemblies from a predetermined lattice;

FIGS. 11A to 11D are illustrations showing uncoupling steps of the gripping apparatus of another embodiment from the control rod side;

DESCRIPTION OF THE PREFERRED EMBODIMENTS

Figure 1:
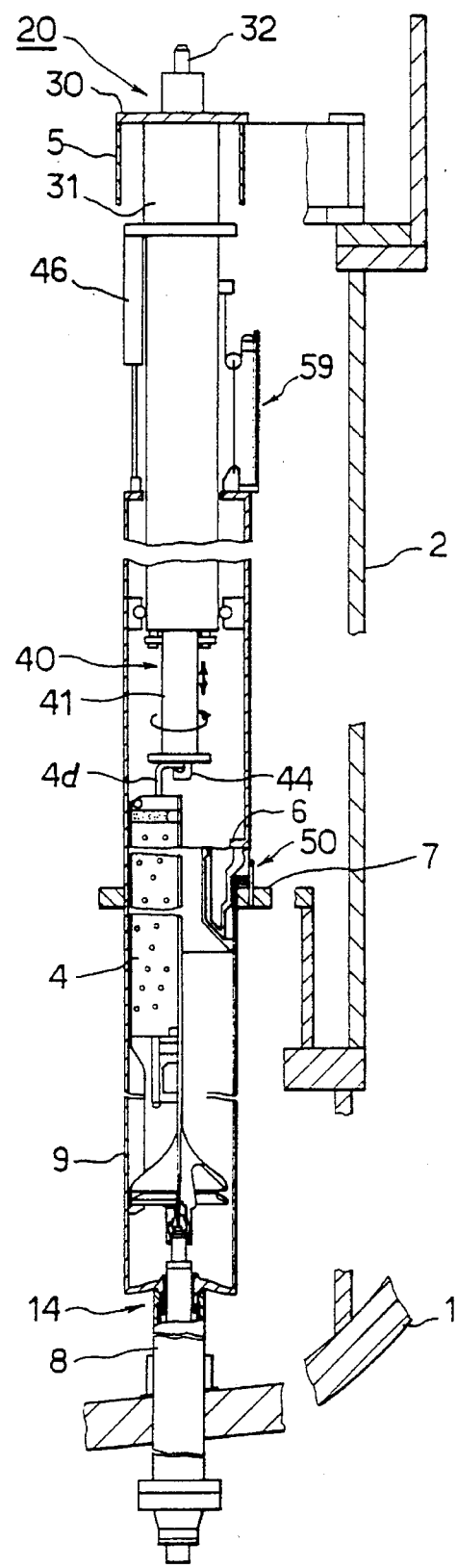
FIG. 1 is a schematic vertical sectional view, partially cut out in section, showing an entire structure of a reactor pressure vessel in which a control rod and fuel supporting member gripping apparatus according to one embodiment of the present invention is hoisted.

A first embodiment of the present invention will be described with reference to the FIGS. 1 to 9. The same reference numerals are attached to the same parts and equivalent parts in FIGS. 1 to 9.

FIG. 1 is a schematic vertical sectional view showing a control rod and fuel supporting member gripping apparatus according to the first embodiment of the present invention which is hoisted in a reactor pressure vessel. FIGS. 2 to 8 show the details of respective sections thereof. The CR (control rod) 4 is detachably connected to the CRD (control rod driving mechanism) 8 by means of a bayonet coupling 14 designated by a reference numeral 15.

A control rod and fuel supporting metal gripping apparatus 20 which is the first embodiment of the present invention is hoisted and carried into the reactor pressure vessel 1 at the time of the periodic inspection of a boiling water reactor (BWR). The CR 4 and the FS (fuel supporting member) 6 which are mounted in the core are removed and hoisted to be carried out of the reactor pressure vessel 1. The control rod and fuel supporting member gripping apparatus 20 is used for reinstalling the CR 4 and the FS 6 and comprises an upper plate 30 which is tied with a hoisting rope or the like of an auxiliary hoist of a fuel exchanging device, not shown, a CR gripping device 40 which is hoisted by the upper plate 30 so that the device is axially rotatable and an FS gripping device 50 which is mounted on the CR gripping device 40 so that the FS gripping device can be lifted up and down.

Figure 2:
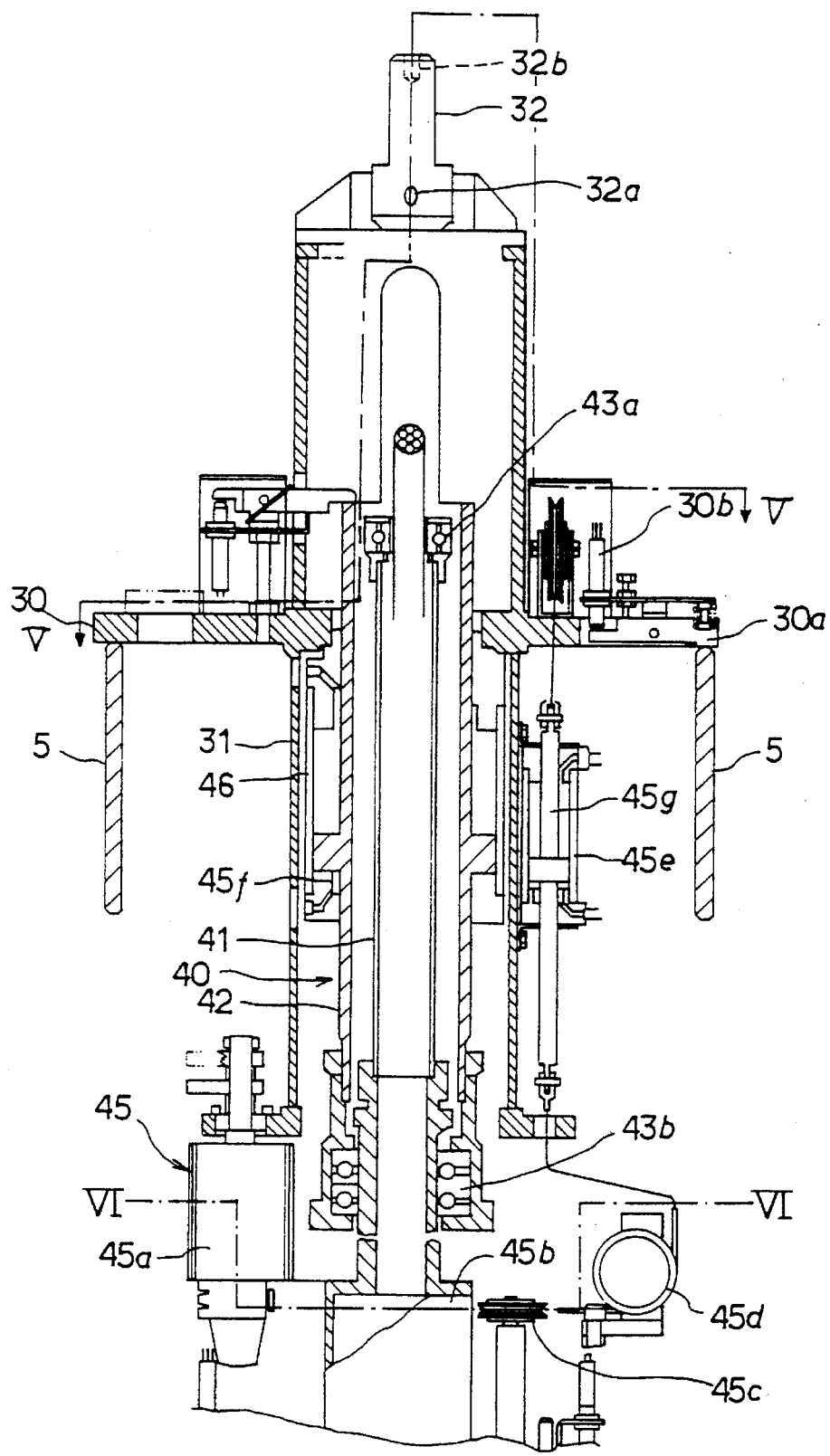
FIG. 2 is a top plan view of the embodiment shown in FIG. 1.

The upper plate 30 is hoisted on a given lattice of the upper lattice plate 5 as shown in FIGS. 1 and 2 so that the entire weight of the control rod and fuel supporting member gripping apparatus 20 is loaded on the upper lattice plate 30 and the supporting member gripping apparatus 20 is prevented from rotating. An upper plate settling detection lever 30a is disposed on the bottom of the square corner of the upper plate 30 so that the detection lever can be swung freely.

When the upper plate 30 is settled on the upper lattice plate 5, the swing end of the upper plate settling detection lever 30a swings and then the upper plate settling detection lever 30a turns "ON" the upper plate settling detection limit switch 30b in order to output an upper plate settling detection signal to the fuel exchanging device or the like through a cable, not shown.

A square supporting cylinder 31 is fastened to the upper plate 30 so that the cylinder 31 goes vertically through the center of the upper plate 30 and a square stud 32 is provided on the top center of the supporting cylinder by means of a pin 32a so that the stud 32 can be swung. Thus, it is not possible to easily change the state of the long control rod and fuel supporting metal gripping device 20 from its storage condition in which the gripping device is laid to the state in which the gripping device 20 is vertically hoisted.

Figure 5:
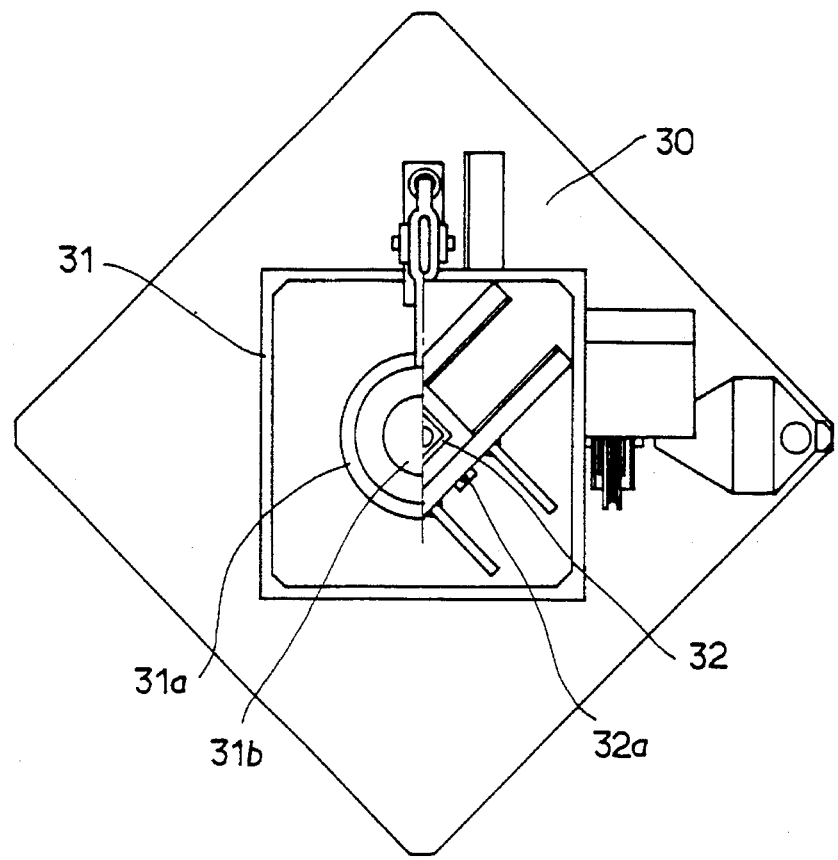
FIG. 5 is a partial sectional view taken along the lines V—V of FIG. 2.

The square stud 32 has a screw hole 32b formed on the top end as shown in FIGS. 2 and 5. A bolt which is provided on the front end of a wire rope such as a torqueless wire is screwed into the screw hole 32b in order to prevent the auxiliary hoist of the fuel exchanging device from rotating. Thus, it is possible to hoist entirely the control rod and fuel supporting member gripping apparatus 20 freely so that the gripping device is not rotated.

The supporting cylinder 31 contains a CR gripping device 40. The CR gripping device 40 contains double internal and external cylinders 41 and 42 which are located coaxially in the supporting cylinder 31. The external cylinder 42 is fastened to the supporting cylinder 31 and the internal rotating cylinder 41 is mounted on the external cylinder by means of a thrust bearing 43a and a radial bearing 43b so that the internal cylinder 41 is axially rotatable.

Figure 4:
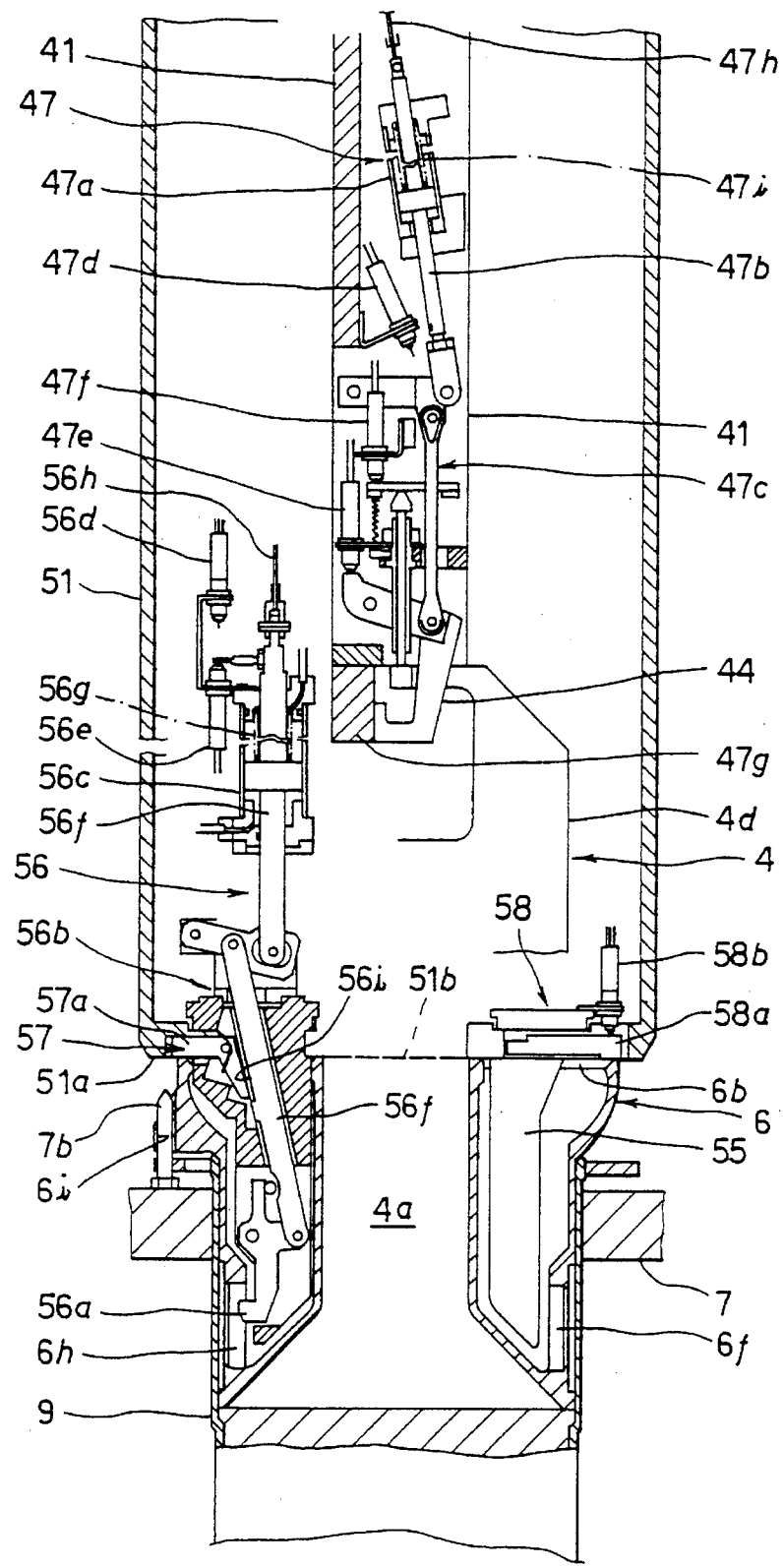
FIG. 4 is a plan view of a bottom portion of the embodiment shown in FIG. 1.
Figure 6:
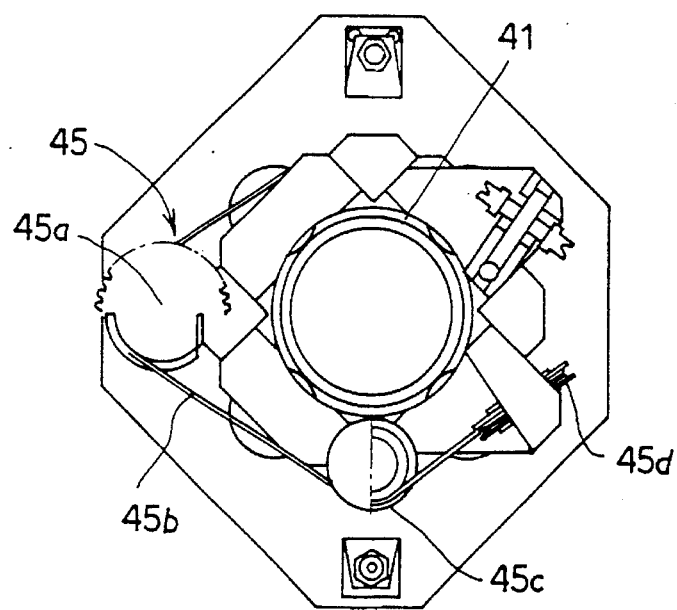
FIG. 6 is a view taken along the lines VI—VI of FIG. 2.

The rotating cylinder 41 has a hook 44 provided on the bottom end thereof which grips and releases the handle 4d as shown in FIGS. 1 and 4. As shown in FIGS. 2 and 6, the rotating cylinder 41 is axially rotatable clockwise and counterclockwise by means of a CR rotating mechanism 45.

The CR rotating mechanism 45 contains a rotating gear 45a which is provided on the side in the middle of the rotating cylinder along the length thereof, the rotating gear 45a being interlocked with the rotating cylinder 41. Both ends of the wire 45b which is wound around the rotating gear 45a are wound around pulleys 45c and 45d and connected to both the top and bottom ends of piston rods 45g of a pair of right and left air cylinders 45e and 45d for rotation driving. When the piston rods 45g reciprocate, the rotating cylinder 41 is rotated axially clockwise and counterclockwise.

The rotating cylinder 41 is lifted up and down by means of a CR lifting air cylinder 46. When low pressure air is supplied to the lift-up chamber, i.e. lower chamber, in the air cylinder 46, the hook 44 which grips the handle 4d of the CR 4 is lifted up slightly and then the hook 44 is lifted up so as to eliminate a play of the handle 4d thereby making the hook 44 fit to the handle 4d. This mechanism relaxes a shock which occurs when the hook 44 is lifted up all at once. When the supplied air pressure is high, the CR lifting air cylinder 46 lifts the handle 4d higher than a time when a low pressure is supplied, for example, by several tens mm.

As shown in FIG. 4, the rotating cylinder 41 incorporates the CR gripping mechanism 47 which is provided on the bottom end of the rotating cylinder 41. The CR gripping mechanism 47 makes the piston rod 47b of the hook opening/closing air cylinder 47a communicate with the swing end of the hook 44 through a link mechanism 47c to change the supply of air to the hook opening/closing air cylinder 47a to the top chamber or the bottom chamber thereby opening or closing the hook 44. Consequently, the handle 4d of the CR 4 is gripped or released. The CR gripping mechanism 47 comprises a hook open detecting limit switch 47d for detecting that the hook 44 is opened, a hook detecting limit switch 47e for detecting that the hook 44 is closed, and a CR settling detection limit switch 47f for detecting that the hook 44 is settled on the handle 4d of the CR 4.

The rotating cylinder 41 has a guide protrusion 47g which is provided on the bottom thereof. The guide protrusion 47g has a guide groove which fits to the cross shaped center of the cross shaped handle 4d, the guide groove being provided on the bottom thereof. If the hook 44 is lifted down to the CR 4, the handle 4d gradually fits to the cross shaped guide groove so as to guide the hook 44 to an optimum position of the handle 4d.

Further, the hook opening/closing air cylinder 47a includes a holding spring 47i which urges the piston rod 47b to the gripping position as a means for corresponding to a trouble of the hook opening/closing air cylinder 47a, so as to hold the gripping action when the supply of air to the air cylinder 47a is interrupted due to a rupture of the air hose. A releasing wire 47h is connected to the piston rod 47b and when the wire 47h is pulled up to resist the force of the holding spring 47i, the hook opening/closing air cylinder 47a is forcibly released.

Figure 3:
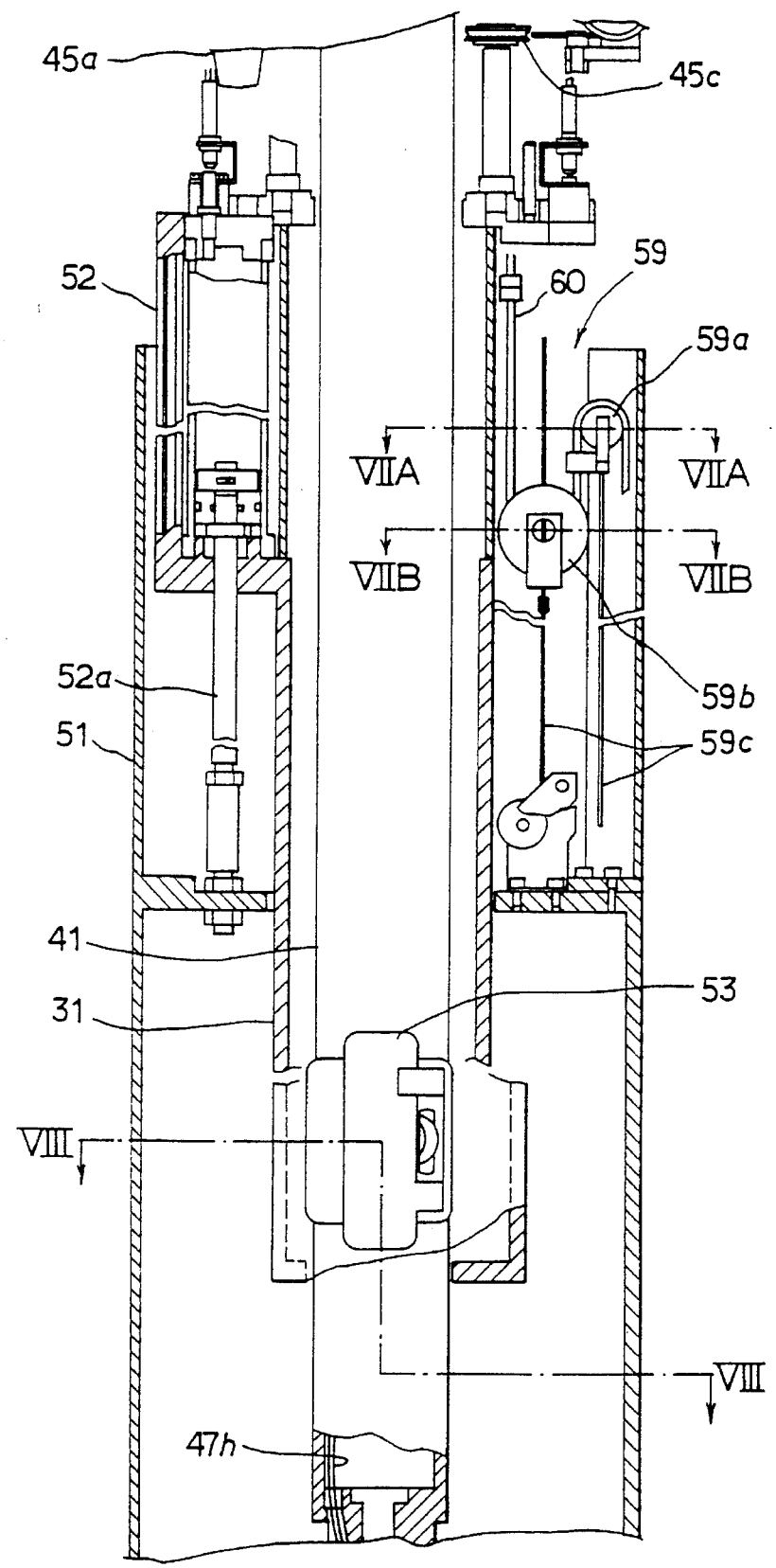
FIG. 3 is a plan view of a middle portion of the embodiment shown in FIG. 1.

On the other hand, in the FS gripping device 50, as shown in FIG. 3, the lower half portions of a square shaped supporting cylinder 31 and a rotating cylinder 41 are inserted into a lifting square cylinder 51 having a diameter larger than that of the supporting cylinder 31, and as shown in FIGS. 7A and 7B, the lifting square cylinder 51 is mounted so as to be lifted up and down so that the lifting square cylinder 51 is axially deviated by 45° with respect to the internal supporting cylinder 31.

That is, an FS lifting air cylinder 52 is fixed on the external side face in the middle along the length of the square supporting cylinder 31 and the lifting square cylinder 51 is held by a piston rod 52a which goes up and down within the FS lifting air cylinder 52 so that the lifting square cylinder can be lifted freely.

As shown in FIG. 8, a plurality of guide rollers 53, 53,—which move on the external faces of the respective corners of the external side face of the square supporting cylinder 31 are provided inside the lifting square cylinder 51. On the other hand, as shown in FIG. 4, the lifting square cylinder 51 has a cross shaped insertion hole 51b which allows the cross shaped handle 4d of the CR 4 to pass therethrough, the hole being provided on the bottom of the lifting square cylinder 51. As shown in FIG. 8, the lifting square cylinder 51 has corner pins 54 which protrude vertically downward and which are in contact with the guide pins of the core supporting plate 7, the core supporting plate 7 being provided on the external faces of the respective corners of the bottom 51a.

Figure 16:
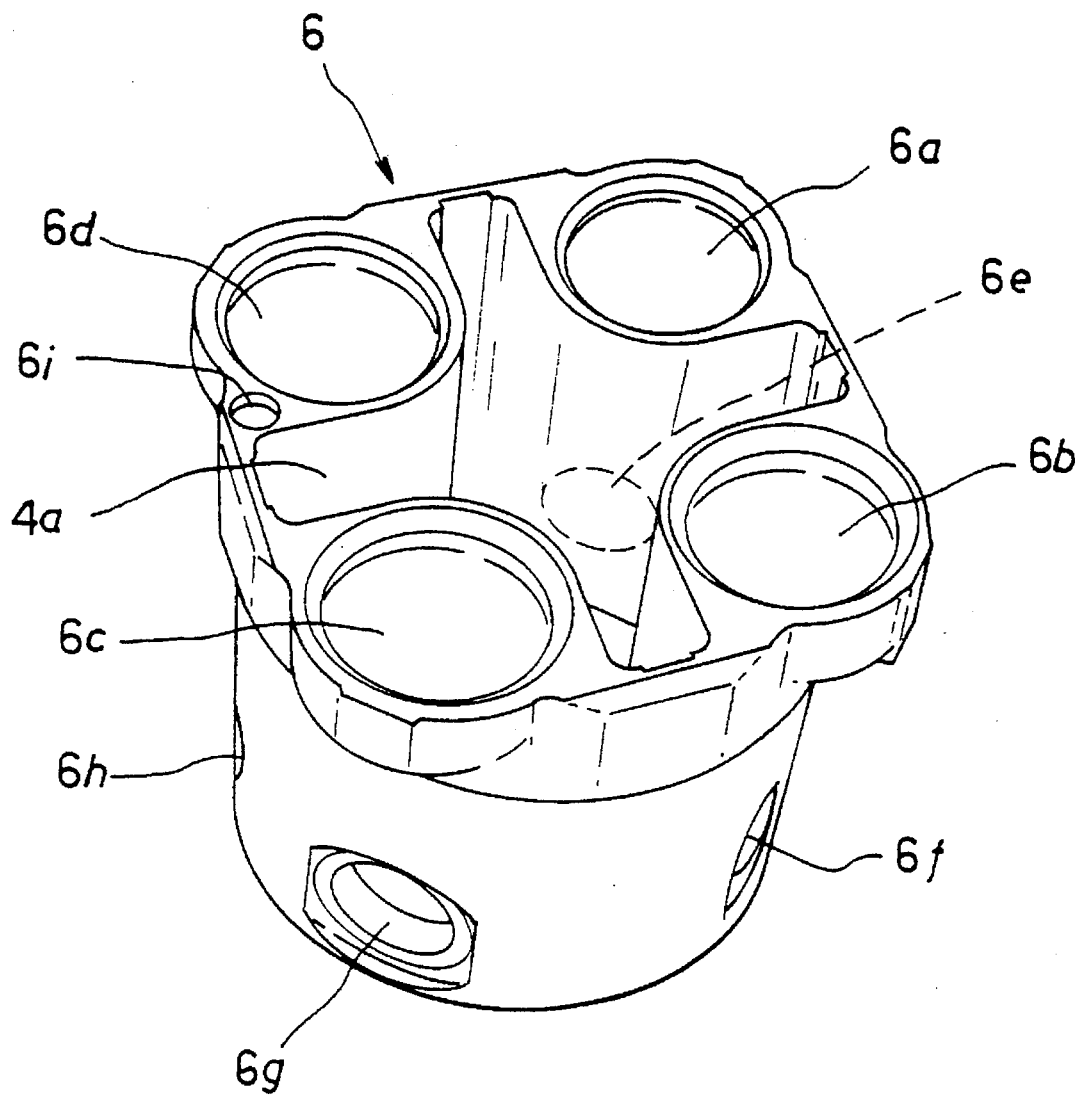
FIG. 16 is an enlarged perspective view of the FS shown in FIG. 15.
Figure 17:
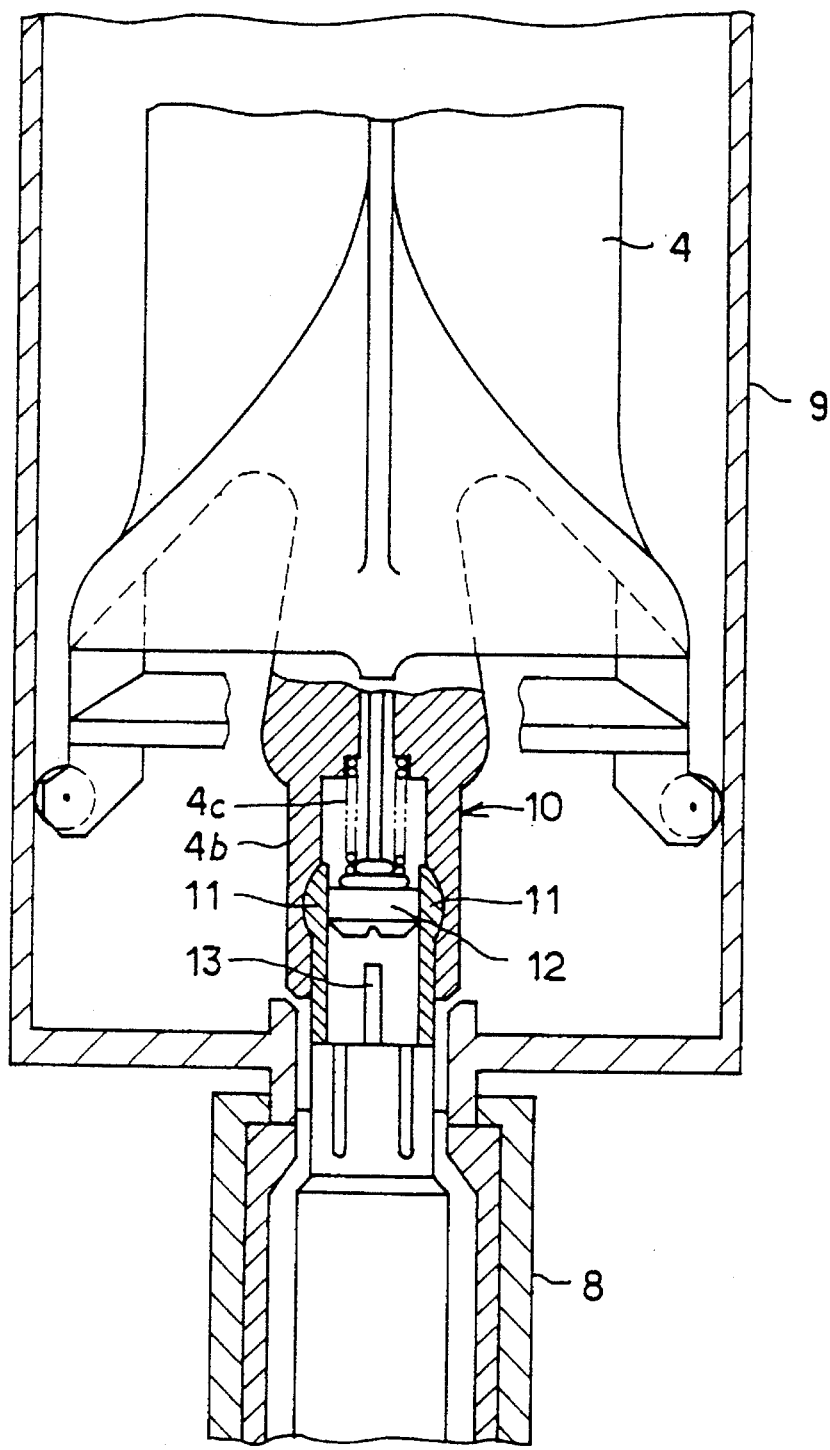
FIG. 17 is a partially enlarged view of the coupling portion between the CR and the CRD.
Figure 18A:
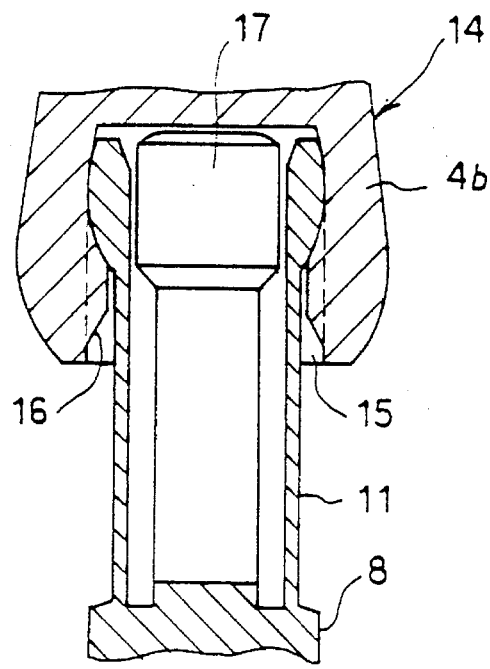
FIGS. 18A to 18C are schematic sectional views of the bayonet coupling as a mechanism for connecting the CR and the CRD.
Figure 18B:
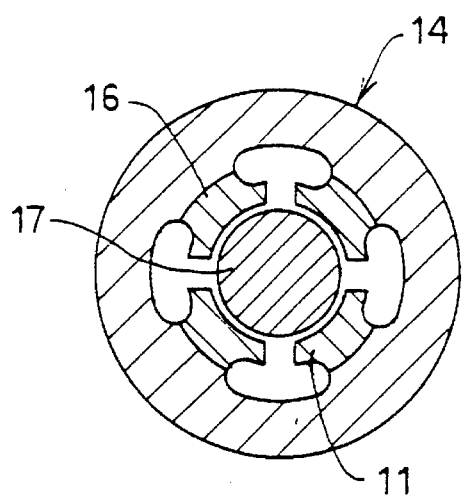
Figure 18C:
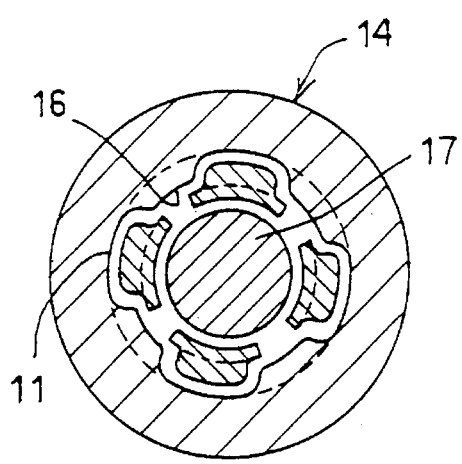
Figure 19A:
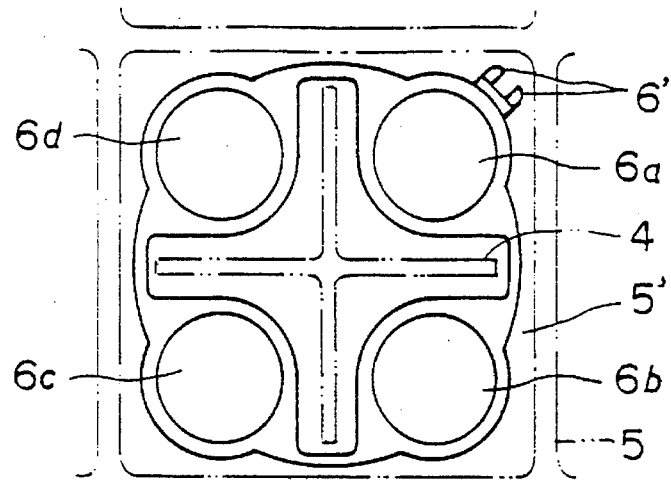
FIGS. 19A to 19C are plan views showing steps of withdrawing fuel assemblies from a desired lattice in accordance with a conventional technique.
Figure 19B:
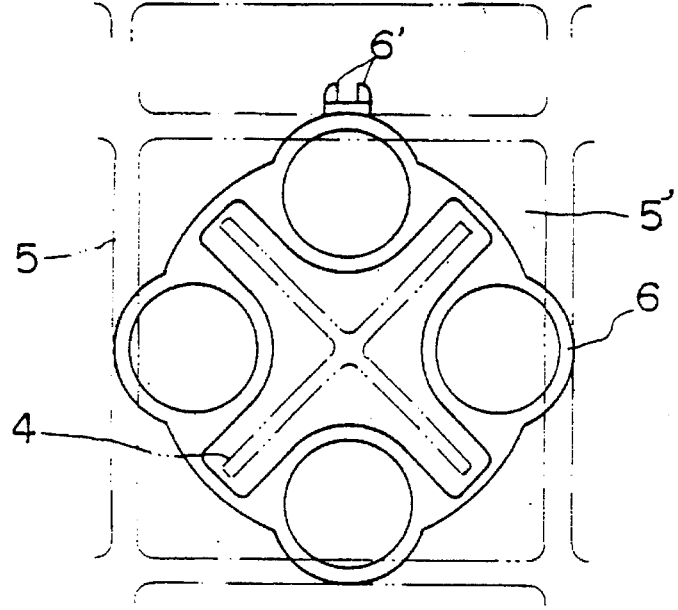
Figure 19C:
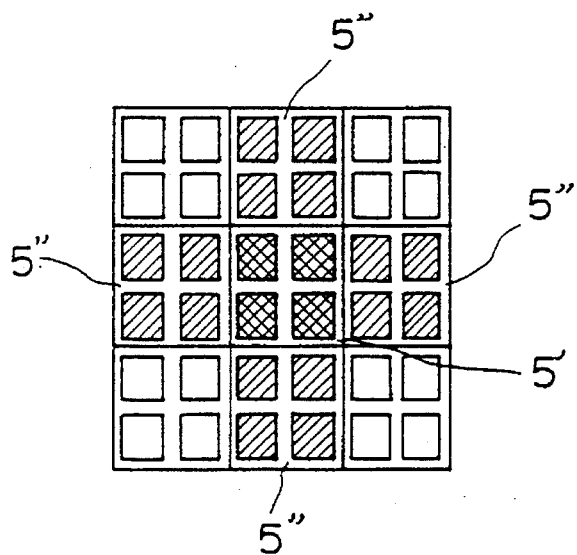

Further, as shown in FIG. 4, the bottom face 51a of the lifting square cylinder 51 has a pair of sheet-shaped guides 55, 55 which are disposed on a pair of corners which diagonally corresponds to each other. The sheet-shaped guides 55, 55 are inserted into a pair of fuel supporting engagement holes 6b and 6d which face each other with respect of the diameter of the FS 6 shown in FIG. 16 so as to guide the hook 44 to the handle 44d of the CR 4.

The lifting square cylinder 51 has a pair of right and left FS gripping mechanisms 56, an FS gripping lock mechanism 57 and an FS settling detection device 58, these mechanisms and device being disposed on the bottom end thereof. FIG. 4 shows only one of a pair of right and left FS gripping mechanisms 56 and the representation of the other side is omitted.

Each FS gripping mechanism 56 comprises an air cylinder 56c which advances or retracts a pair of plungers 56 through a link mechanism 56b, the plungers being protruded through a pair of orifices which face each other with respect to the diameter of the FS 6, for example, 6f, 6h, in order to grip the FS 6, an FS gripping detection limit switch 56d for detecting the gripping action of the FS 6 by means of the FS gripping air cylinder 56c and an FS releasing detection limit switch 56e for detecting the releasing action of the FS 6.

The FS gripping air cylinder 56c contains a gripping holding spring 56g which urges the piston rod 56f in the direction in which the gripping action is held, as a means for treating a trouble of the FS gripping air cylinder 56c, if the supply of air to the FS gripping air cylinder 56c is interrupted due to a breakage of an air hose when the FS 6 is gripped by means of the FS gripping air cylinder 56c.

A wire rope 56h for the releasing operation is connected to the FS gripping air cylinder 56c. By pulling the wire rope 56h so as to resist the force of the gripping holding spring 56g, the gripping action of the FS gripping air cylinder 56c is forcibly changed to releasing action so as to retract a pair of the plungers 56a, 56a from a pair of the orifices 6f and 6h of the FS 6 backward, that is, to the inside, thereby forcibly releasing the FS 6.

The FS gripping lock mechanism 57 has a lock lever 57a which is provided so as to be able to swing freely on the bottom face 51b of the lifting square cylinder 51. The lock lever 57a is urged always to be engaged with an engagement hole 56i in a communicating rod 56f of the link mechanism 56b of the FS gripping mechanism 56 in order to hold the communicating rod 56f. When the bottom face 51a of the lifting square cylinder 51 is settled on the top face of the FS 6, the lock lever 57a is swung and disengaged from the engagement hole 56i of the communicating rod 56f of the lifting square cylinder 51. Consequently, the communicating rod 56f is released to allow the link mechanism to operate.

When the bottom face 51a of the lifting square cylinder 51 is separated from the top face of the FS 6, the lock lever 57a is swung to be engaged with the engagement hole 56i of the communicating rod 56f. Consequently, the action of releasing the communicating rod 56f is held to lock the gripping action of the FS 6.

The FS settling detection device 58 has a settling detection lever 58a which is provided so as to be swung freely on the bottom face 51a of the lifting square cylinder 51. When the settling detection lever 58a is settled on the top face of the FS 6, an FS settling detection limit switch 58 is turned on/off by the swing end thereof in order to output or stop an FS settling signal.

As shown in FIGS. 1 and 3, a cable absorbing mechanism 59 is provided on the internal face of the top of the lifting square cylinder 51. This mechanism absorbs ropes 60 such as air hoses, cables connected to respective air cylinders 45e, 45f, 46, 47a, 52, 56c and operating wires 45h, 47h, 56h by means of pulleys 59a, 59b and a spring 59c in order to prevent a trouble due to the looseness of the ropes 60.

Next, a case in which the CR 4 and the FS 6 are lifted up from a water filled reactor pressure vessel 1 by using the control rod and fuel supporting member gripping apparatus 20 having the aforementioned construction at the time of the periodic inspection of the BWR will be described below.

As shown in FIG. 9A, the CR 4 is inserted fully into the core to maintain the subcriticality of four fuel assemblies 3, 3, 3, 3 which are placed in a lattice and two fuel assemblies 3, 3 which are placed diagonally are pulled out of the core by means of a fuel exchanging device or the like.

As shown in FIG. 9B, a blade guide (control rod guiding device) 61 in which a pair of dummy channels 61a, 61b are connected diagonally by the handle 61c is inserted into positions from which two fuel assemblies 3, 3 are removed. After that, the remaining two fuel assemblies 3, 3 are pulled out of the core, as shown in FIG. 9C.

As shown in FIG. 9D, the CR 4 is guided by means of the blade guide 61 and moved downward of the core by means of the CRD 8 so that the CR 4 is completely pulled out. Further, as shown in FIG. 9E, the blade guide 61 is pulled out of the core.

After these operations, the bolt of the wire rope of the auxiliary hoist of a fuel exchanging device, not shown, is screwed into the screw hole 32b of the square stand of the control rod and fuel supporting metal gripping device 20 according to the present invention, and then the fuel assembly is lowered into the reactor pressure vessel 1. Thereafter, as shown in FIG. 1, the upper plate 30 of the control rod and fuel supporting metal gripping device 20 is settled on the upper lattice plate 5 to transfer the total weight of the control rod and fuel supporting member gripping apparatus 20 from the wire rope to the upper lattice plate 5.

When the upper plate 30 is settled on the top face of the upper lattice plate 5, the upper plate settling detection lever 30a comes into contact with the top face of the upper lattice plate 5 to turn on the upper plate settling detection limit switch 30b. Then, an upper plate settling detection signal is output to the fuel exchanging device or the like through a cable, not shown.

At this time, the bottom face 51a of the lifting square cylinder 51 is settled on the top face of the FS 6 and the top face of the handle 4d of the CR 4 at the same time, and both the CR settling detection limit switch 47f and the FS settling limit switch 58b output settling signals.

Further, the lock lever 57a is disengaged from the engagement hole 56i of the communicating rod 56f in order to release the locking condition of the lock mechanism 57.

Next, when air is supplied to the FS gripping air cylinder 56c, a pair of right and left plungers 56a, 56a are protruded into a pair of orifices 6f, 6h of the FS 6 through the link mechanism 56b which is unlocked, in order to hold the FS 6. At this time, the FS gripping detection limit switch 56d outputs a gripping signal for detecting the gripping condition of the FS 6.

When air is supplied to the gripping side of the hook opening/closing air cylinder 47a, the hook 44 is closed while gripping the handle 4d with a slight vertical play, thereby gripping the CR 4. At this time, the hook close detection limit switch 47e outputs a hook close signal.

Then, when low pressure air is supplied to the CR lifting air cylinder 46, the rotating cylinder 41 rises slightly so that the hook 44 comes into contact with the bottom face of the handle 4d.

That is, because the pressure of air supplied to the CR lifting air cylinder 46 is low, the rotating cylinder 41 rises by only a gap, i.e. play, between the hook 44 and the handle 4a of the CR 4 so as to make the hook 44 contact the handle 4d firmly.

When air is supplied to the lift-up chamber, i.e. lower chamber, of the FS lifting air cylinder 52, the lifting square cylinder 51 rises. Thus, the FS 6 which is held by means of the FS gripping mechanism 56 is pulled slightly upward to remove the FS 6 from the core supporting plate 7. The FS 6 is raised slightly higher than the top face of the handle 4d of the CR 4 and the FS 6 is maintained at that height.

When the lifting square cylinder 51 is lifted up, a plurality of guide rollers 53, 53,—which are provided inside thereof rotate on the external face of the supporting cylinder 31 in order to prevent the FS 6 which is held by means of the lifting cylinder 51 and the FS gripping mechanism 56 from rotating axially. Thus, it is possible to prevent the FS 6 from colliding with the fuel assembly 3 loaded within the lattice.

After this operation, high pressure air is supplied to the lift-up chamber, i.e. lower chamber, of the CR lifting air cylinder 46 in order to raise the CR gripping mechanism 47 by several tens mm and rotate the CR 4.

Consequently, all the weight of the CR 4 and the members which are connected with the bayonet coupling 14 of the CR 8 are received from the control rod and fuel supporting member gripping apparatus 20 and the weight is loaded and supported by the upper lattice plate 5.

When air is supplied to one of the CR rotating air cylinders 45e, 45f, for example, 45e, while hoisting the CR 4 as described above, the rotating gear 45a is turned clockwise. By turning the rotating cylinder 41 by 45° for example, by means of the rotating gear 45a, it is possible to release connection between the CR 4 and the CRD 8 by the bayonet coupling 14. If air is supplied to the other CR rotating air cylinder 45f to turn the rotating cylinder 41 by 45°, the CR 4 is connected with the CRD 8 by the bayonet coupling 14.

After the CR 4 is removed from the CRD 8, the CR 4 and the FS 6 are hoisted to the top portion of the core by winding the wire rope of the auxiliary hoist or the like of the fuel exchanging device.

The CR 4 and the FS 6 are lifted through the upper lattice plate 5 from the inside of the reactor pressure vessel to a reactor well located above the reactor pressure vessel and then moved to a fuel storage pool which communicates with the reactor well while keeping the CR 4 and the FS 6 in water. Thereafter, the CR and FS gripping mechanisms 47 and 56 are actuated to release the CR 4 and the FS 6 at a predetermined position. Then, the CR 4 and the FS 6 are released and stored to terminate the operation. However, if these gripping mechanisms 47 and 56 are not capable of releasing the CR 4 and the FS 6 for some reason, the releasing operation wires 47h and 56h are pulled strongly. Consequently, it becomes possible to forcibly release the CR 4 and the FS 6.

If the CR 4 and the FS 6 are gripped by means of both the CR gripping mechanism 47 and the FS gripping mechanism 56, the gripping action is maintained by the holding springs 47g and 56g and the locking mechanism 57. Thus, it is possible to prevent an unexpected accident which may occur when the CR 4 and the FS 6 are accidently released if the CR 4 and the FS 6 are being gripped and transferred.

According to the described embodiment of the present invention, it is possible to grip and remove the CR 4 and the FS 6 by means of the control rod and fuel supporting member gripping apparatus 20 and further to hoist the CR 4 and the FS 6 and carry them out of the reactor pressure vessel 1 at the same time. Thus, a sequence of such operations can be performed simply, securely and rapidly, and the working efficiency of BWR's periodic inspection can be enhanced remarkably.

Figure 10:
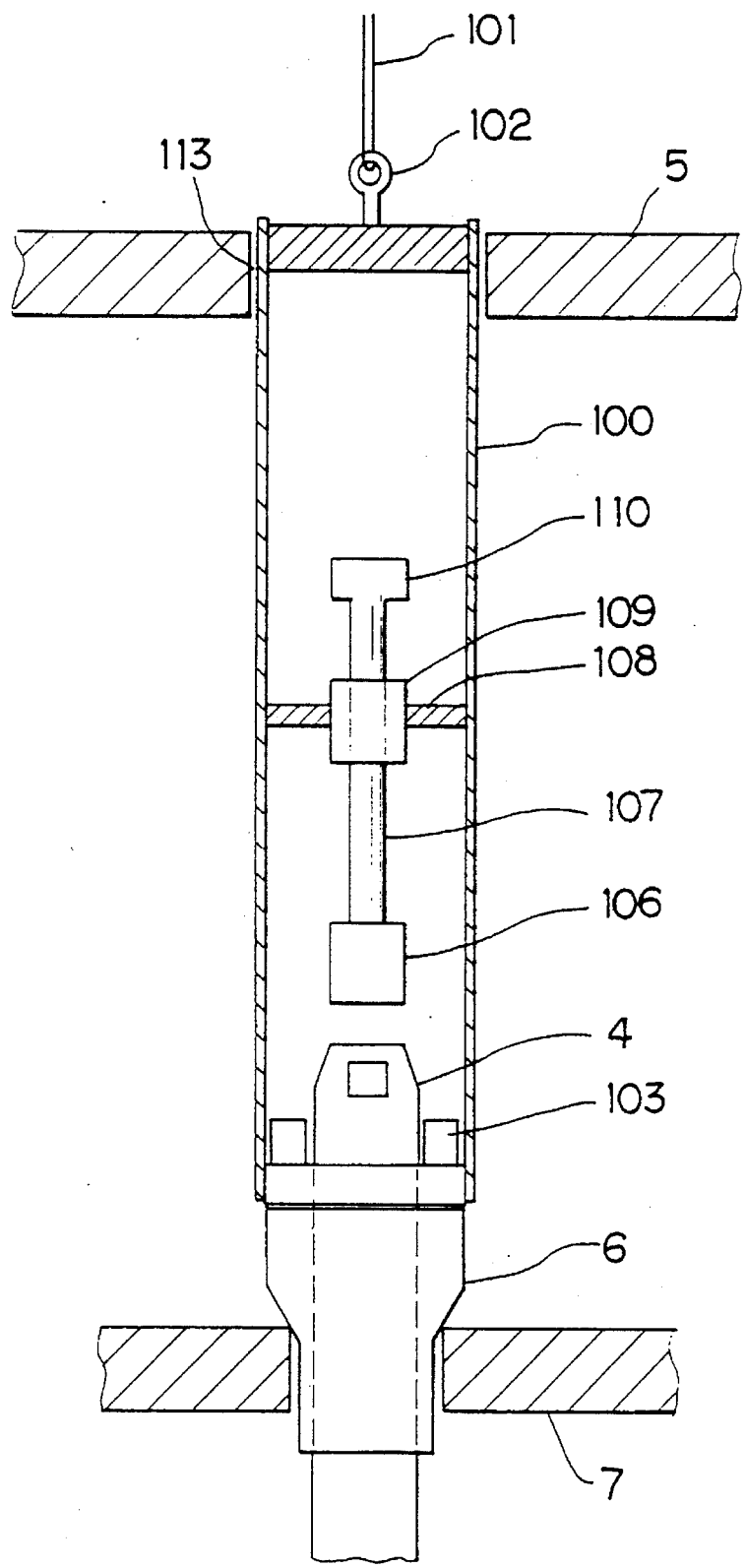
FIG. 10 is a schematic vertical sectional view, partially cutout in section, showing a portion of a reactor pressure vessel to which a control rod and fuel supporting member gripping apparatus according to another embodiment of the present invention is secured.

FIG. 10 represents a second embodiment according to the present invention, and referring to FIG. 10, the gripping apparatus body 100 is hoisted down into the reactor pressure vessel by means of a wire rope 101 driven by a hoist, not shown. A hanging member 102 is secured to the upper portion of the gripping apparatus body 100 and the wire rope 101 is firmly engaged with the hanging member 102. A fuel supporting member gripping device 103 is mounted to a lower portion of the gripping apparatus body 100 to grip the fuel supporting member 6 mounted on a core supporting plate 7. Further, a control rod gripping device 106 for gripping a neck portion of a control rod 4 is supported by the gripping apparatus body 100 through a shaft member 107 and a support plate 108 supporting the shaft member 107 so that the shaft member 107 is attached to the support plate 108 to be movable up and down with respect to the support plate 108. A control rod rotating mechanism 109 for rotating the shaft member 107 with respect to the support plate 108 is mounted to a portion near the attaching portion of the shaft member 107 to the support plate 108. A stopper member 110 is provided for the upper end of the shaft member 107 for preventing the control rod gripping device 106 and the shaft member 107 from coming off from the support plate 108 at a time when the gripping apparatus body 100 is lifted upward.

In FIG. 10, an upper lattice plate 5 is a plate for supporting the top end of a fuel assembly, not shown, in a horizontal plane and four fuel assemblies are charged, in a usual core running state, in one cell 113 in which the gripping apparatus body 100 is located. The gripping body 100 has a horizontal cross section of a square shape slightly smaller than that of the cell 113 so as to prevent the gripping body 100 from being rotated in the cell 113.

Hereunder, a method for taking out, i.e. uncoupling, the control rod (CR) 4 and the fuel supporting member (FS) 6 will be described with reference to FIGS. 10 and 11.

FIG. 11A shows a state before the uncoupling operation, in which the FS 6 is settled on a control rod guide tube 114 supported by the core supporting plate 7 and the FS 6 is prevented from rotation by a pin 115 secured to the core supporting plate 7. The CR 4 penetrates inside the FS 6 so that the top end thereof extends upward, as viewed, from the FS 6.

From this state, the gripping apparatus body 100 is hoisted down from an upper portion on the FS 6 by means of the wire rope 101, and this state corresponds to the state shown in FIG. 10. Then, the fuel supporting member gripping device 103 is operated to grip the FS 6, and the control rod gripping device 106 is also operated to grip the CR 4. The wire rope 101 is thereafter lifted up to thereby lift up the gripping apparatus body 100. At this time, the FS 6 is also lifted up together with the gripping apparatus body 100, but the control rod gripping device 106 is not lifted up because of the sliding motion of the shaft member 107.

FIG. 11B shows a state in which the FS 6 is lifted up.

In the next step, the control rod rotating member 109 is driven to rotate the control rod gripping device 106 and the CR 4 by 45° to thereby uncouple the CR 4 and the control rod driving mechanism. FIG. 11C shows a state before this rotation. Then, the CR 4 and the FS 6 are taken out of the core by hoisting up the gripping apparatus body 100.

FIG. 11D shows a state before the lift-up of the CR 111. When the gripping apparatus body 100 is lifted up, the control rod gripping device 106 is not slid off because of the location of the stopper member 110 and the control rod 4 is lifted up together with the FS 6.

Figure 12A:
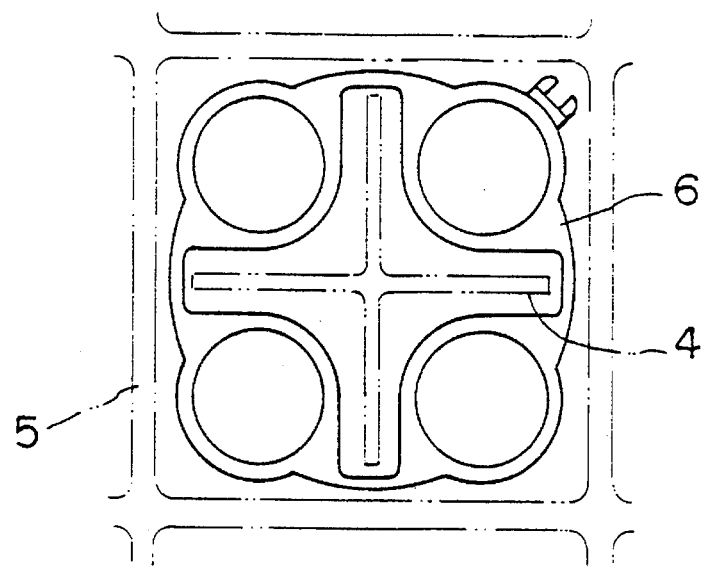
FIGS. 12A to 12C are illustrations showing steps of withdrawing fuel assemblies from a desired lattice.
Figure 12B:
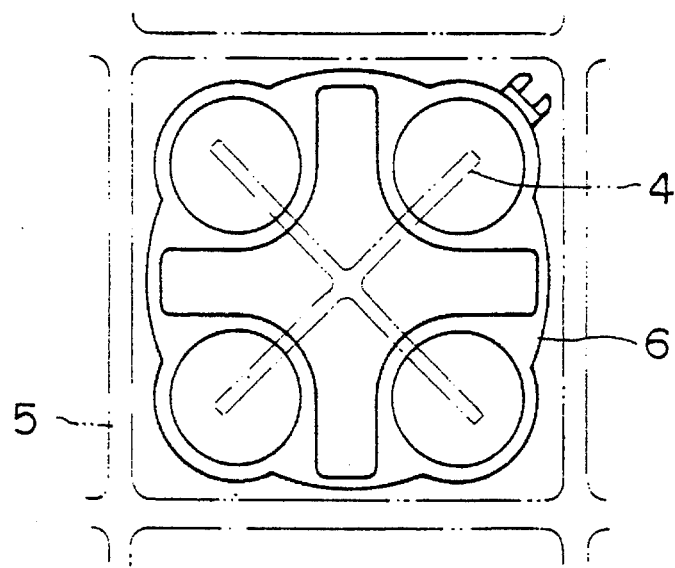

As described hereinbefore with reference to two preferred embodiments, according to the present invention, the FS 6 is not rotated horizontally from the setting state of FIG. 12A to the state of FIG. 12B, and only the CR 4 is rotated to thereby uncouple the same. Accordingly, the CR 4 and the FS 6 can be taken out of the core simultaneously.

Figure 12C:
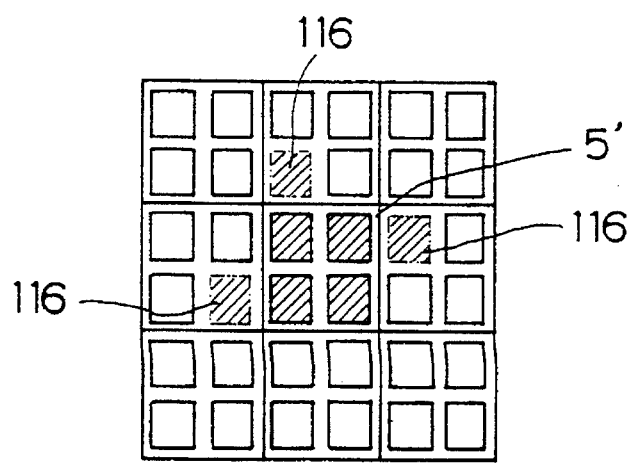
Figure 13:
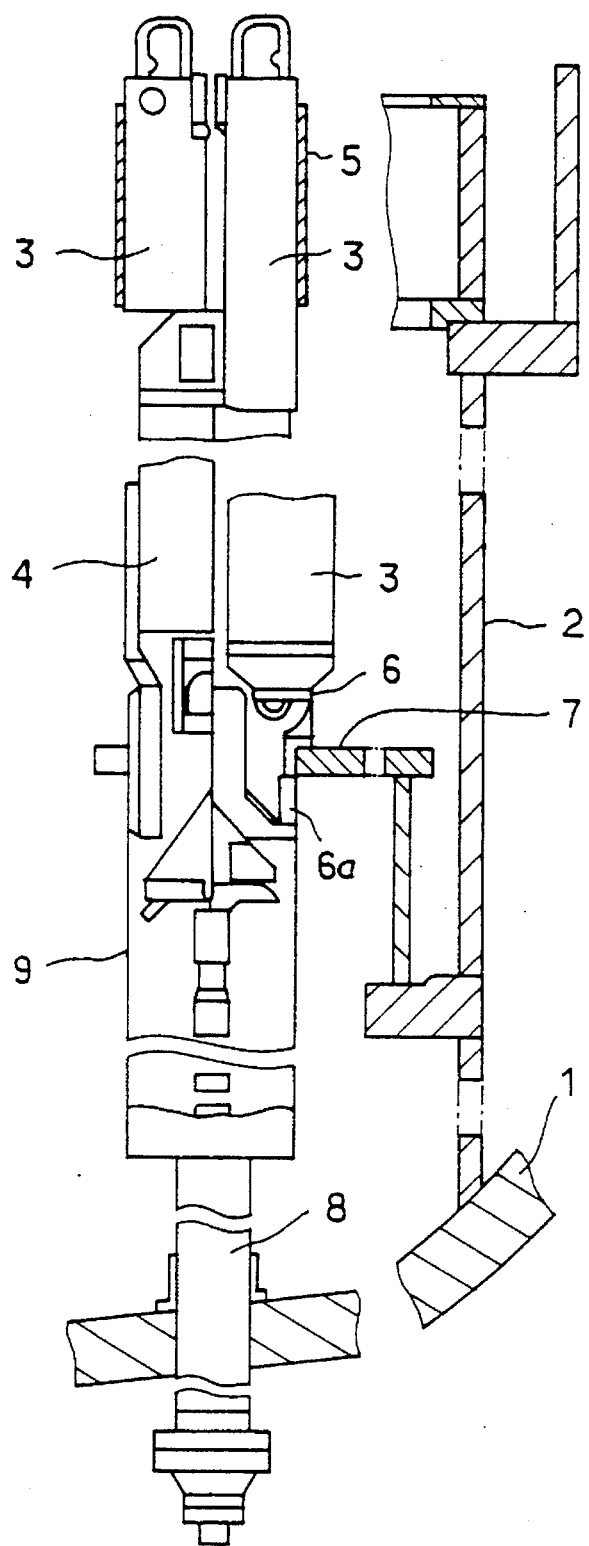
FIG. 13 is a sectional view, partially cut out in section, of the core of a general BWR.
Figure 14:
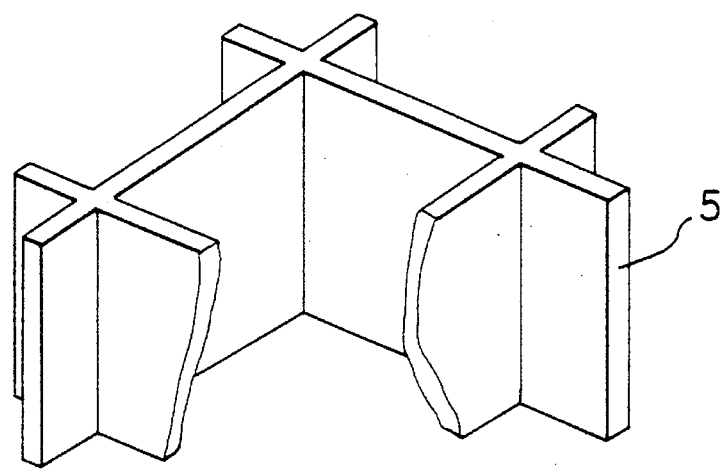
FIG. 14 is a perspective view, partially cut out in section, of the top lattice plate shown in FIG. 13.
Figure 15:
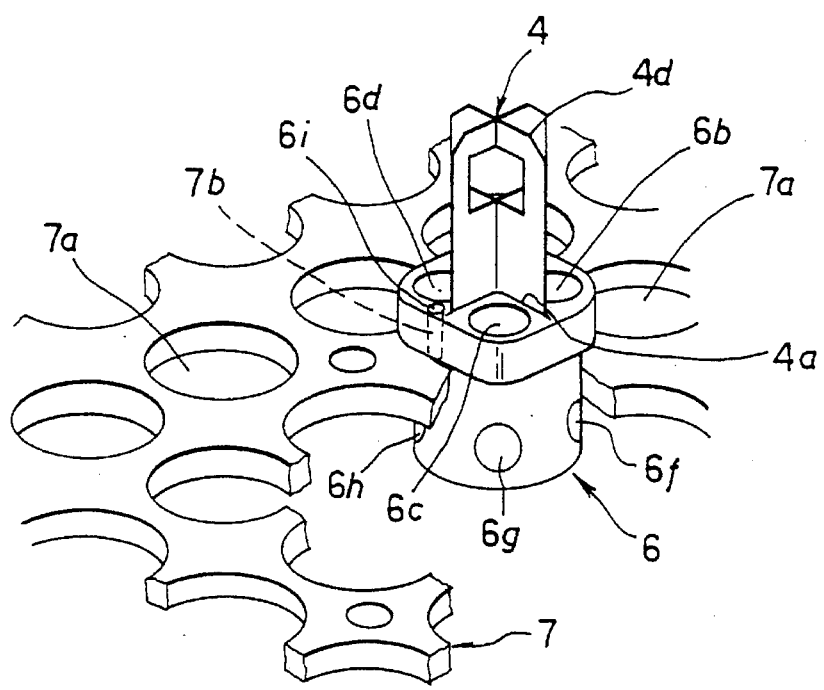
FIG. 15 is a perspective view, partially cut out in section, of the CR, the FS and the core supporting plate shown in FIG. 13.

FIG. 12C shows a state in which fuel assemblies are withdrawn for setting a television camera for monitoring the working state of the gripping apparatus body. The fuel assemblies are expected in future not to be withdrawn through the used reliance of the gripping apparatus.

As described hereinbefore with reference to two preferred embodiments, according to the present invention, the fuel supporting member is not moved horizontally in the state shown in FIG. 12B from the state shown in FIG. 12A mentioned with reference to the conventional structure, and only the control rod is rotated to perform the uncoupling thereof. Accordingly, the control rod and the fuel supporting member in the given fuel assembly can be withdrawn at the same time without moving or shifting the fuel assemblies disposed neighboring the given fuel assembly. With reference to FIG. 12C, the fuel assembly 116 is now withdrawn for disposing a television camera for monitoring the operation of the control rod and fuel supporting member gripping apparatus, but it will be expected in future not to remove such fuel assembly upon repeated confirmation of the performance of this gripping apparatus.

As described above, according to the present invention, it is possible to grip and remove the control rod and the fuel supporting member which are located within the reactor pressure vessel and hoist the control rod and the fuel supporting member so as to be taken out of the reactor pressure vessel. Thus, as compared with the conventional case in which the control rod and the fuel supporting member are gripped separately by means of different gripping devices successively and conveyed out of the reactor pressure vessel after they are removed from the gripping devices, the present invention is capable of improving the working efficiency of hoisting operation markedly. Consequently, it is possible to improve the working efficiency of the BWR's periodic inspection.

That is, for example, in the conventional technique, it is required to remove totally twenty fuel assemblies, but, according to the present invention, only the seven fuel assemblies have to be removed, and preferably four fuel assembly, in future. Thus, the working of the operator to remove the fuel assemblies can be extremely reduced, being advantageous. This advantage results in the reduction of a space of a pool in which the withdrawn control rods and the fuel supporting members are stored.

Further, in the control rod rotating mechanism, the rotating members which rotate the rotating body which has the hook for gripping the handle of the control rod are connected to the clockwise/counterclockwise rotating air cylinder through a wire in order to turn the rotating body. Thus, it is possible to reduce the load of the rotating force.

If the supply of a drive medium such as air to the control rod gripping driving source such as air cylinder is interrupted when the control rod is gripped by means of the hook which is actuated by the control rod gripping driving source, the gripping action of the control rod gripping driving source is maintained by the force of the spring. Thus, even if the supply of the drive medium to the control rod gripping air cylinder is interrupted due to a breakage of the air hose or the like when the control rod is gripped and hoisted by means of the hook, the hook does not release the control rod. Thus, the safety operation can be assured.

When the control rod cannot be released due to a trouble in the control rod gripping driving source, it is possible to forcibly release the control rod by pulling the rope.

A pair of plungers are protruded into a pair of the existing side holes of the fuel supporting metal to support the fuel supporting metal, it is not necessary to make devices for the fuel supporting metal for assuring the gripping operation. Further, because a pair of plungers are inserted into a pair of side holes which faces each other with respect to the diameter of the fuel supporting metal to support and hoist the fuel supporting metal, the fuel supporting metal can be supported and hoisted stably with a balance with respect to the diameter thereof. Thus, it is possible to increase the operational reliability and the safety of supporting and hoisting the fuel supporting member.

When the fuel supporting member is gripped by means of the fuel supporting member gripping device and hoisted, the gripping state is locked by the locking mechanism. Thus, it is possible to prevent the fuel supporting member from dropping due to an action of releasing the fuel supporting member and damaging, thereby increasing the operational reliability and safety.

If the supply of a drive medium such as air to the fuel supporting member gripping driving source such as air cylinder is interrupted due to a breakage of the drive line such as air hose when the fuel supporting member is held by means of the fuel supporting member gripping driving source, the gripping action of the fuel supporting member gripping driving source is maintained by the force of a spring. Thus, if the supply of the drive medium to the fuel supporting member gripping driving source is interrupted due to a breakage of the air hose when the fuel supporting metal is gripped and hoisted, the fuel supporting member is held, thereby securing the safety operation.

When an action of releasing the fuel supporting member cannot be performed due to a trouble in the fuel supporting member gripping driving source, it is possible to forcibly release the fuel supporting member by pulling a rope.

What is claimed is:

1. A control rod and fuel supporting member gripping apparatus for gripping a fuel supporting member and a control rod, the fuel supporting member being mounted on a core supporting plate located below an upper lattice plate within a reactor pressure vessel and having fuel assembly supporting engagement holes in which bottom portions of a plurality of fuel assemblies are inserted to support the fuel assemblies and an insertion hole through which a control rod is passed, the control rod being detachably connected with a control rod driving mechanism by means of a bayonet coupling and being passed through a control rod passage so as to be lifted up and down in order to remove the fuel supporting member and the control rod from the core supporting plate and the control rod driving mechanism, said control rod and fuel supporting member gripping apparatus comprising:

a gripping apparatus body hoisted vertically liftably in an installed state within the reactor pressure vessel;

a fuel supporting member gripping device disposed at a portion below the gripping apparatus body for supporting the fuel supporting member fixedly in its axial direction but supported to be liftable;

a control rod gripping device disposed at a portion below the gripping apparatus body to be liftable up and down and rotatable with respect to the gripping apparatus body;

means for rotating the control rod gripping device with respect to the gripping apparatus body; and means for withdrawing the fuel supporting member and the control rod from an upper portion of the reactor pressure vessel substantially at the same time such that the fuel supporting member is raised to a height above the control rod and held at said height.

2. A control rod and fuel supporting member gripping apparatus according to claim 1, wherein said fuel supporting member gripping device includes a detection means for detecting a fact of settlement of the gripping apparatus body on the fuel supporting member gripping device.

3. A control rod and fuel supporting member gripping apparatus according to claim 1, further comprising a detection means for detecting a fact that a rotation angle of said control rod gripping device is rotated by an angle over a predetermined angle.

4. A control rod and fuel supporting member gripping apparatus according to claim 1, wherein an upper lattice plate is disposed above said gripping apparatus body at an upper portion of the reactor pressure vessel and an upper plate is disposed on the upper lattice plate through a gripping apparatus body lifting device for lifting up and down the gripping apparatus body with respect to the upper lattice plate.

5. A control rod and fuel supporting member gripping apparatus according to claim 4, wherein said control rod gripping device comprises a hook means which is hung by a rotating member rotatably fixed to the upper plate in order to releasably grip a handle of the control rod, a first driving means for driving said control rod gripping device for making the hook perform gripping and releasing operations, a second driving means for lifting up and down the control rod lifting mechanism by raising the hook means, a third driving means having a reciprocal piston rod for driving a winding means, and a rotating device for rotating the rotating body clockwise or counterclockwise by connecting both ends of the winding means attached to a rotating member in rotational association with the rotating body to both ends of the reciprocal piston rod of the third driving means.

6. A control rod and fuel supporting member gripping apparatus according to claim 5, wherein said first, second and third driving means are air cylinder assemblies.

7. A control rod and fuel supporting member gripping apparatus according to claim 5, wherein said first driving means includes a biasing means for maintaining the gripping operation of the hook means when a supply of fluid is eliminated.

8. A control rod and fuel supporting member gripping apparatus according to claim 7, wherein said biasing means is a spring.

9. A control rod and fuel supporting member gripping apparatus according to claim 5, wherein said first driving means is connected to a rope means for releasing the hook means at a time when the rope means is pulled to thereby forcibly perform the releasing action.

10. A control rod and fuel supporting member gripping apparatus according to claim 1, wherein said fuel supporting member gripping device comprises a first driving source which makes a pair of retractable gripping plungers protrude from the inside of the fuel supporting member into a pair of side holes communicating with the respective fuel assembly supporting engagement holes of the fuel supporting member and facing each other in a direction of a diameter thereof in order to grip the fuel supporting member, and a second driving source which grips the fuel supporting member by means of the gripping plungers and which hoist the fuel supporting member.

11. A control rod and fuel supporting member gripping apparatus according to claim 10, wherein the fuel supporting member gripping portion comprises a locking mechanism for holding the first driving source in the gripping position when said fuel supporting member is gripped by means of the first driving source and hoisted by means of a lifting mechanism in order to prevent the gripped fuel supporting member from being released.

12. A control rod and fuel supporting member gripping apparatus according to claim 11, wherein said first driving source includes a gripping state holding mechanism for maintaining the gripping state of the fuel supporting member when a driving supply is eliminated.

13. A control rod and fuel supporting member gripping apparatus according to claim 11, wherein said first driving source is connected to a rope and a pair of plungers are retracted from a pair of side holes to an inside of said fuel supporting member, when said rope is pulled, in order to forcibly release the fuel supporting member.

14. A method of withdrawing a control rod and fuel supporting member from a reactor pressure vessel, in which the fuel supporting member is mounted on a core supporting plate located below an upper lattice plate within a reactor pressure vessel and has fuel assembly supporting engagement holes in which bottom portions of a plurality of fuel assemblies are inserted to support the fuel assemblies and an insertion hole through which a control rod is passed, and the control rod is connected to a control rod driving mechanism by means of a bayonet coupling and is passed through a control rod passage so as to be lifted up and down freely in order to remove the fuel supporting member and the control rod from the core supporting plate and the control rod driving mechanism, the method comprising the steps of:

taking out the fuel supporting member from the core supporting plate and lifting the fuel supporting member upward from the core supporting plate by a predetermined distance to a portion where a bottom portion of the fuel supporting member is maintained above an upper portion of a control rod handle;

rotating the control rod in an axial direction to separate the control rod from the control rod driving mechanism; and withdrawing the fuel supporting member and the control rod from an upper portion of the reactor pressure vessel substantially at the same time, wherein the fuel supporting member is raised to a height above the control rod and held at said height, the fuel supporting member is prevented from axially rotating and the control rod is thereafter rotated.

* * * * *